US012746177B2

(12) United States Patent
Xiang et al.

(10) Patent No.: US 12,746,177 B2
(45) Date of Patent: Sep. 29, 2026

(54) VARIABLE AMPLITUDE ADJUSTING MECHANISM AND FASCIA GUN WITH THE SAME

(71) Applicant: SICHUAN QIANLI-BEOKA MEDICAL TECHNOLOGY INC., Chengdu (CN)

(72) Inventors: Rong Xiang, Chengdu (CN); Wen Zhang, Chengdu (CN); Hailin Tang, Chengdu (CN)

(73) Assignee: SICHUAN QIANLI-BEOKA MEDICAL TECHNOLOGY INC., Chengdu (CN)

( * ) Notice: Subject to any disclaimer, the term of this patent is extended or adjusted under 35 U.S.C. 154(b) by 0 days.

(21) Appl. No.: 19/214,867

(22) Filed: May 21, 2025

(65) Prior Publication Data

US 2026/0157923 A1 Jun. 11, 2026

(30) Foreign Application Priority Data

Dec. 9, 2024 (CN) ........................ 202423023099.5

(51) Int. Cl.
*A61H 23/00* (2006.01)
*A61H 23/02* (2006.01)

(52) U.S. Cl.
CPC ....... *A61H 23/006* (2013.01); *A61H 23/0263* (2013.01); *A61H 2201/5053* (2013.01)

(58) Field of Classification Search
CPC .. A61H 23/00; A61H 23/006; A61H 23/0263; A61H 2201/5053
See application file for complete search history.

(56) References Cited

U.S. PATENT DOCUMENTS 4,566,442 A * 1/1986 Mabuchi ............ A61H 23/0254 601/101
2002/0082532 A1* 6/2002 Tucek ................ A61H 23/0254 601/107

(Continued)

FOREIGN PATENT DOCUMENTS

CN 116155027 A * 5/2023 ............. H02K 7/075
CN 220070137 U 11/2023

(Continued)

OTHER PUBLICATIONS

English Abstract for CN 117860552 A (2024).

*Primary Examiner* — Tu A Vo
*Assistant Examiner* — Kelsey E Baller
(74) *Attorney, Agent, or Firm* — Caesar Rivise, PC

(57) ABSTRACT

The invention relates to fascia guns, specifically a variable amplitude adjusting mechanism and a fascia gun incorporating it, including a piston rod, a transmission arm, and a rotatable eccentric wheel. One end of the transmission arm is hinged to the slidably arranged piston rod. The eccentric wheel includes an eccentric post and an adjusting slider, which is slidably connected to the post. The post is hinged to the transmission arm. A motor assembly's output shaft connects to the eccentric wheel's input end, with its axis parallel to the eccentric post's axis. The eccentric post slides perpendicularly to the motor shaft's axis. At least part of the motor assembly is slidably arranged along the shaft's axial direction. A driving mechanism moves this part of the motor assembly axially, thereby adjusting the distance between the motor shaft and the eccentric post. This model is particularly suited for fascia gun products.

9 Claims, 7 Drawing Sheets

(56) References Cited

U.S. PATENT DOCUMENTS

| | | | | |
|---|---|---|---|---|
| 2003/0195443 | A1* | 10/2003 | Miller | A61H 1/008<br>601/108 |
| 2021/0113427 | A1* | 4/2021 | Liu | A61H 23/0254 |
| 2022/0047453 | A1* | 2/2022 | Wersland | A61H 23/0263 |
| 2022/0168177 | A1* | 6/2022 | Vierheller | A61H 23/006 |
| 2024/0197561 | A1 | 6/2024 | Zhou et al. | |

FOREIGN PATENT DOCUMENTS

| | | | | | |
|---|---|---|---|---|---|
| CN | 117598897 | A | * | 2/2024 | A61H 23/006 |
| CN | 117860552 | A | * | 4/2024 | A61H 23/02 |

* cited by examiner

VARIABLE AMPLITUDE ADJUSTING MECHANISM AND FASCIA GUN WITH THE SAME

CROSS-REFERENCE TO RELATED APPLICATIONS

This application claims priority to CN 202423023099.5, filed Dec. 9, 2024, the contents of which are incorporated herein by reference in their entireties.

TECHNICAL FIELD

The utility model relates to the field of fascia guns, and in particular, to a variable amplitude adjusting mechanism and a fascia gun with the same.

BACKGROUND

A fascia gun, also known as a deep muscle fascia impactor, is a soft tissue massage tool that is used to relax the soft tissue of the human body through high-frequency impact. Existing fascia guns drive massage heads to perform linear reciprocating movements through pistons; the massage heads contact with the human body to generate high-frequency vibration acting on the deep muscles, so as to reduce local tissue tension, relieve pain and promote blood circulation. By using the existing fascia guns, users can choose the appropriate amplitude depth of the fascia gun for massage physiotherapy according to their own situations. For example, professional athletes need to use fascia guns with large amplitude depth to relieve post-exercise muscles. Ordinary consumers, especially novices, need to use fascia guns with small amplitude depth at the beginning, and then gradually use those with large amplitude depth as needed. However, for most of fascia guns or muscle massagers in the current market, a slider-crank mechanism and an eccentric wheel are used to rotate the motor so as to realize the reciprocating movement of a massage head. An eccentric distance on the eccentric wheel is constant, so the reciprocating movement stroke of the fascia gun is constant, and it is impossible to change the amplitude and meet more usage scenarios.

For example, the application with publication number of CN117860552A discloses a solution by which the amplitude of the fascia gun can be adjusted. A core mechanism to realize amplitude adjustment is that a slider is slidably arranged on the eccentric wheel, the slider is engaged with the eccentric wheel through a wedge-shaped plane, and the slider is rotatably connected to a connecting rod. Lateral movements between the eccentric wheel and the slider generate through the up-and-down movement of the adjusting slider and the wedge-shaped inclined plane, so that the axis connecting the connecting rod on the slider and the motor axis are changed to adjust the eccentric distance. Due to the restriction of adjustment principle, this solution needs to reserve a large internally arranged space, that is, a space for arranging related adjustment mechanisms needs to be reserved to arrange the components of the adjustment mechanisms therein. Except for components that can be changed in position, the positions of the motor assembly and other components are fixed. For the market demand for the increasingly lightweight and compact adjusting mechanism, it is difficult to apply the existing adjusting mechanism to some small and exquisite fascia gun products.

SUMMARY

The technical problem to be solved by the utility model is to provide a variable amplitude adjusting mechanism and a fascia gun with the same, wherein at least part of the structure of a motor assembly can directly move along with a motor output shaft, so as to realize sliding amplitude adjustment and further reduce internally arranged space.

A technical solution adopted by the utility model to solve the technical problem is that: the variable amplitude adjusting mechanism includes a piston rod, a transmission arm and a rotatable eccentric wheel, wherein one end of the transmission arm is hinged to the piston rod and the piston rod is slidably arranged; the eccentric wheel includes an eccentric post and an adjusting slider, the adjusting slider is slidably connected to the eccentric post, and the eccentric post is hinged to the transmission arm; a motor assembly, wherein a motor output shaft of a motor assembly is connected to an input end of the eccentric wheel, the axis of the motor output shaft is arranged parallel to the axis of the eccentric post, the sliding direction of the eccentric post is perpendicular to the axial direction of the motor output shaft, and at least part of the motor assembly is slidably arranged along the axial direction of the motor output shaft; and a motor assembly driving mechanism is connected to the motor assembly and drives at least part of the motor assembly to move along the axial direction of the motor output shaft, whereby driving the eccentric post to slide and adjust a distance between the motor output shaft and the eccentric post. During actual adjustment, the motor assembly is driven to move in the direction of the motor output shaft by the motor assembly driving mechanism, and the moving motor output shaft drives the eccentric post to slide laterally along the direction perpendicular to the motor output shaft. Because the distance between the motor output shaft and the eccentric post is an eccentric distance, the eccentric post sliding laterally leads to the change of the eccentric distance, and then the sliding amplitude of the piston rod is changed.

As an embodiment of the motor assembly driving mechanism, the following solution can be selected: the motor assembly driving mechanism includes an adjusting knob and a threaded adjusting holder threadedly engaged with the adjusting knob; the threaded adjusting holder is connected to the bottom of the motor output shaft through an adjusting holder bearing; and the axis of the adjusting knob and the axis of the motor output shaft are coaxially arranged. When the adjusting knob is rotated, a relative position between the adjusting knob and the threaded adjusting holder changes accordingly because the threaded adjusting holder is threadedly engaged with the adjusting knob. The position change of the threaded adjusting holder leads to the position change of the motor assembly and the motor output shaft, thus changing the eccentric distance and realizing the final amplitude adjustment.

Further, in order to ensure that the adjusting knob does not move along the direction of the motor output shaft during rotation and the threaded adjusting holder better moves, the following solution can be selected: the fixed shell includes a groove arranged in an inner wall; the adjusting knob includes an annular boss, and the annular boss is arranged on the peripheral wall surface of the adjusting knob around the axis of the adjusting knob; and the adjusting knob is rotatably arranged in the groove of the fixed shell through the annular boss. The adjusting knob is constrained in the groove of the fixed shell through the limit of the annular boss in an entire rotation process. This fitting mode can ensure the rotation of the adjusting knob, thereby ensuring the stable movement of the threaded adjusting holder.

On the basis of the above solution, in order to make the motor assembly move more stably and reliably during the reciprocating movement of the piston rod, the following solution is preferred: the motor assembly includes a guide post arranged at the top, where the guide post is uniformly arranged around the motor output shaft, the axial direction of the guide post is parallel to the axial direction of the motor output shaft, and the guide post is sleeved with a compression spring; and a fixing stand, where the guide post is slidably arranged in a guide hole of the fixing stand. In actual use, the amplitude adjustment can be performed during the reciprocating movement of the piston rod. Through fitting of the guide post and the guide hole of the fixing stand, shaking and vibration in an adjustment process can be effectively reduced, and the motor assembly can be guided to move smoothly along the direction of the guide post. The compression spring is in a compressed state and can always provide external force for the motor assembly, and force balance can be realized through the external force and the driving force from the adjusting knob, so that the motor assembly is in a stable state regardless of being in a moving process or in an unchanged position, and the vibration interference during the operation of the piston rod is eliminated.

As an embodiment where the eccentric post slides, the following solution can be selected: the eccentric post includes a first eccentric post; the adjusting slider includes a first adjusting slider; an output shaft of the first eccentric post is hinged to the transmission arm; the first adjusting slider is arranged at the top of the motor output shaft; the first eccentric post includes a first eccentric post inclined plane; the first adjusting slider includes a first adjusting slider inclined plane angled relative to the motor output shaft; and the first adjusting slider inclined plane is slidably engaged with the first eccentric post inclined plane to drive the first eccentric post to slide along the axial direction perpendicular to the motor output shaft. When the motor assembly and the motor output shaft move, the top of the motor output shaft drives the first adjusting slider to move. Because the first adjusting slider inclined plane is angled relative to the motor output shaft, the first adjusting slider that moves drives the first eccentric post to slide along the axial direction perpendicular to the motor output shaft through slidable engagement of the first adjusting slider inclined plane and first eccentric post inclined plane, thus changing the eccentric distance and realizing the final amplitude adjustment.

Further, preferably, the first eccentric post includes a first eccentric post guide step arranged on both sides thereof; the first adjusting slider includes a first adjusting slider guide step arranged on both sides thereof; the eccentric wheel includes an eccentric holder, where the eccentric holder includes a first eccentric chute horizontally arranged and a second eccentric chute vertically arranged; the first eccentric post guide step is slidably engaged with the first eccentric chute; and the first adjusting slider guide step is slidably engaged with the second eccentric chute. Relative sliding among the eccentric holder, the first eccentric post and the first adjusting slider is established, so that the first eccentric post guide step is slidably engaged with the first eccentric chute, and the first adjusting slider guide step is slidably engaged with the second eccentric chute, ensuring that both the first eccentric post and the first adjusting slider are in a controllable constraint state in the adjustment process. Therefore, the eccentric distance can be adjusted even during the reciprocating movement of the mechanism.

As an embodiment of the motor assembly, the following solution can be selected: the motor assembly includes a motor stand, wherein the motor stand is provided with a first mounting cylinder and a second mounting cylinder that have mutually perpendicular axes, the motor output shaft is rotatably mounted in the first mounting cylinder and is capable of sliding in relation to the first mounting cylinder, and the piston rod is slidably arranged in the second mounting cylinder; an outer rotor and a magnet steel piece integrated in the outer rotor are secured onto the motor output shaft, and a coil assembly is sleeved on the first mounting cylinder; and an upper end of the motor output shaft is connected to a motor assembly driving mechanism, and a lower end of the motor output shaft is provided with a wedge-shaped plane slidably engaged with the eccentric post. In this solution, the motor assembly is divided into a moving part and a fixed part. Specifically, the moving part includes the outer rotor and the magnet steel piece integrated in the outer rotor, and the outer rotor and the magnet steel piece integrated in the outer rotor slide along the axial direction of the motor output shaft together with the motor output shaft. The fixed part includes a coil assembly, the first mounting cylinder and second mounting cylinder of the motor stand, and the positions of the coil assembly and the first mounting cylinder and second mounting cylinder of the motor stand are relatively fixed. The structure of the motor assembly can reduce the overall volume of the motor assembly, thereby saving the internally arranged space thereof.

As another embodiment of the motor assembly driving mechanism, the following solution can be selected: motor assembly driving mechanism includes a knob cover and a threaded slider threadedly engaged with a threaded sleeve on the knob cover, the threaded slider is connected to the top of the motor output shaft through a threaded bearing, and the axis of the knob cover and the axis of the motor output shaft are coaxially arranged; a left limit edge and a right limit edge are respectively arranged on both sides of the threaded slider, and extend along the direction of the motor output shaft; the left limit edge is slidably arranged in a fixing slot of the fixed shell; and the right limit edge is slidably arranged in a fixing slot of a rear shell. During actual adjustment, a relative position between the knob cover and the threaded slider is changed by rotating the knob cover. The left limit edge and the right limit edge are respectively arranged on both sides of the threaded slider; the left limit edge is slidably arranged in the fixing slot of the fixed shell; and the right limit edge is slidably arranged in the fixing slot of a rear shell. In actual use, the left limit edge and the right limit edge can move only in the direction of the corresponding fixing slot, so as to prevent the threaded slider from rotating during the rotation of the knob cover, that is, the threaded slider can move upward or downward only along the direction of the motor output shaft. The special structural design of the threaded slider enables the mechanism to adjust the eccentric distance during the reciprocating movement of the mechanism.

Further, as another embodiment where the sliding of the eccentric post is realized, the following solution can be selected: the eccentric post includes a second eccentric post; the adjusting slider includes a second adjusting slider; an output shaft of the second eccentric post is hinged to the transmission arm; the second eccentric post includes an oblique slot of second eccentric post angled relative to the axis of the motor output shaft; and the second adjusting slider includes a fixing slot of second adjusting slider, where the direction of the fixing slot of second adjusting slider is perpendicular to the motor output shaft, and a bottom end of the motor output shaft passes through the second adjusting slider and is slidably engaged with the oblique slot of second eccentric post to drive the second eccentric post to slide along the direction of the fixing slot of second adjusting slider. In the embodiment, the second adjusting slider is used to restrict the movement direction of the second eccentric post through the fixing slot of second adjusting slider, and the bottom end of the motor output shaft passes through the second adjusting slider and directly drives the second eccentric post to move. The driving principle thereof is also realized through the oblique slot of second eccentric post angled relative to the axis of the motor output shaft. The compact structural design eliminates the eccentric holder, thereby significantly saving valuable internally arranged space.

In order to enhance the stability of slidable engagement among components, the following solution is preferred: the cross-section of the oblique slot of second eccentric post is T-shaped, and the motor output shaft is clamped in the oblique slot of second eccentric post through a T-shaped inclined plane at the bottom end; and the cross-section of the fixing slot of second adjusting slider is T-shaped, and the second eccentric post is clamped in the fixing slot of second adjusting slider through a T-shaped lug boss on a side wall. Vibration generated during the reciprocating movement of the mechanism may lead to disengagement among the components slidably engaged. Therefore, the T-shaped oblique slot of second eccentric post and the T-shaped fixing slot of second adjusting slider can be used to prevent both the motor output shaft and the second eccentric post from stable operation, so that the amplitude adjustment can be performed even during the reciprocating movement of the mechanism.

When the above structure is applied to fascia gun products, the following solution can be selected: a guide ring is provided, in which the piston rod is slidably arranged. When the fascia gun is used for massaging, the motor assembly is driven to move along the direction of the motor output shaft only by the motor assembly driving mechanism, then the eccentric post can be driven to slide, so as to adjust a distance (namely, eccentric distance) between the motor output shaft and the eccentric post, and finally realize the change of the sliding amplitude of the piston rod and the amplitude adjustment of the fascia gun.

The utility model has the beneficial effects that: through sliding of the motor assembly, the motor output shaft of the motor assembly directly serves as a component for driving the eccentric post to slide, thereby greatly simplifying related components, and saving required arrangement space and valuable internal space. Therefore, the related fascia gun products can be designed more exquisitely, and the user experience is greatly improved.

Because the motor assembly is at least partially slidable, the first eccentric post moves away from the axial direction of the motor output shaft to obtain larger amplitude when the motor moves away from the eccentric wheel. Generally, when the amplitude of the fascia gun is increased, the overall vibration thereof will also be increased. However, in this case, because the center of mass of the motor is further away from the position of the eccentric wheel, the center of mass of the fascia gun also changes, that is, the center of mass of the fascia gun also moves away from the eccentric wheel. The position change of the center of mass of the fascia gun counteracts the vibration with the corresponding amplitude change, and then counteracts the vibration intensification caused by the larger amplitude, thereby stabilizing the vibration of the whole fascia gun without obvious fluctuation. In addition, the position change of the center of mass of the fascia gun can also simultaneously lead to the change in the inherent frequency of the whole fascia gun, and inhibit the transmission of high-frequency vibration to the hand of a user to hold the fascia gun.

In addition, the structural feature that the motor assembly can partially slide is that the fixed part of the motor assembly and the moving part of the motor assembly can move relatively. A magnetic sensor can be mounted on the fixed part, such as a stator stand of the motor assembly, and then the change of the position relationship between the stator stand and the rotor part in the moving part can be detected by the magnetic sensor. While the rotor part slides to change the amplitude, an amplitude change value can be transmitted to the user in a digital display mode in real time according to magnetic field parameters detected by the magnetic sensor.

The utility model is particularly applicable to the fascia gun products.

Figure 1:
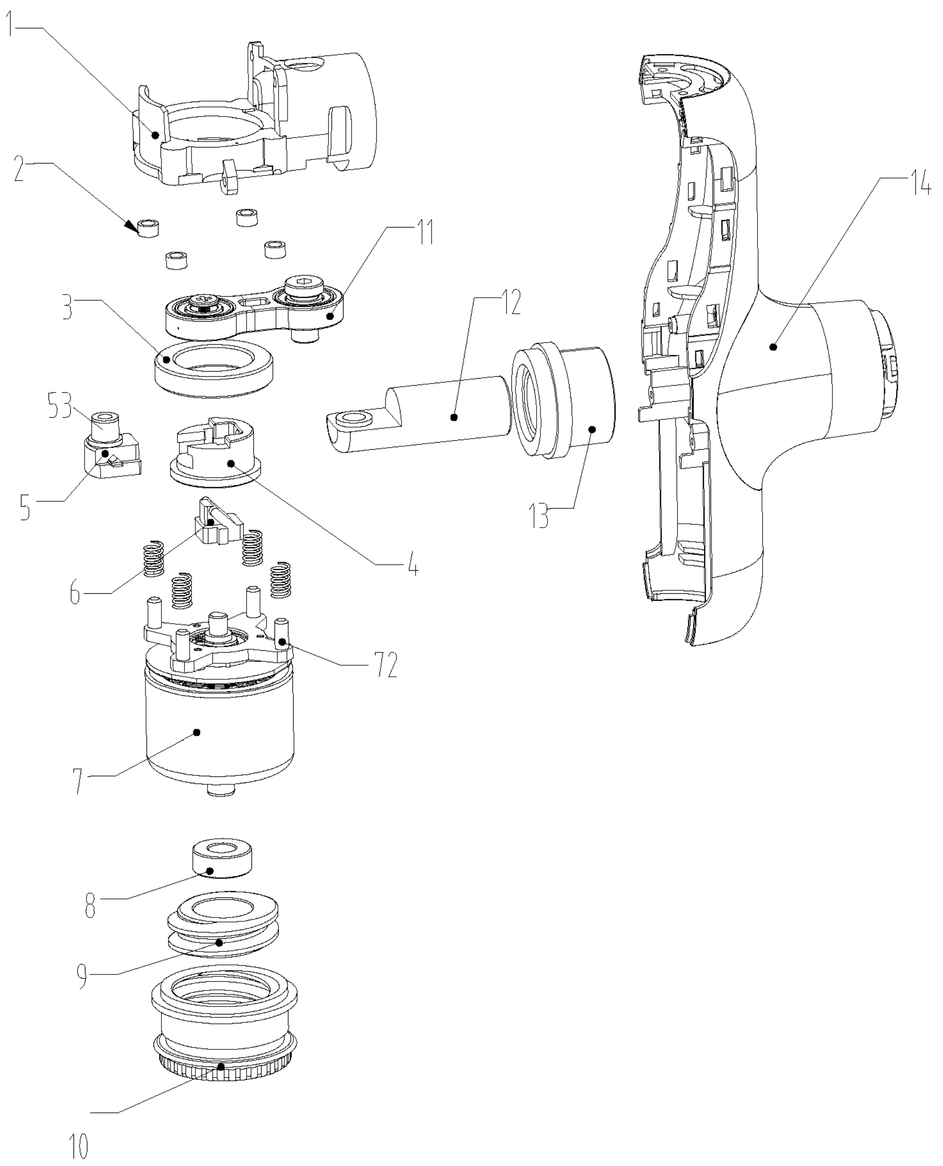
FIG. 1 is an exploded schematic diagram of a fascia gun when an embodiment of the utility model is applied to a fascia gun product.

Symbols are as follows: fixing stand 1, damping guide sleeve 2, eccentric holder bearing 3, eccentric holder 4, first eccentric chute 41, second eccentric chute 42, first eccentric post 5, first eccentric post inclined plane 51, first eccentric post guide step 52, output shaft 53, first adjusting slider 6, first adjusting slider inclined plane 61, first adjusting slider guide step 62, motor assembly 7, motor output shaft 71, guide post 72, motor stand 73, first mounting cylinder 731, second mounting cylinder 732, outer rotor 733, magnet steel piece 734, coil assembly 735, adjusting holder bearing 8, threaded adjusting holder 9, adjusting knob 10, transmission arm 11, piston rod 12, guide ring 13, fixed shell 14, motor stand bearing 15, rear shell 16, second adjusting slider 17, second eccentric post 18, oblique slot of second eccentric post 181, fixing slot of second adjusting slider 182, threaded bearing 19, threaded slider 20, left limit edge 20A, right limit edge 20B, threaded sleeve 21, threaded sleeve screw 22, knob cover 23, decorative top cover 24, and knob cover screw 25.

DESCRIPTION OF PREFERRED EMBODIMENTS

The utility model will be further explained with reference to accompanying drawings and embodiments.

An embodiment of a variable amplitude adjusting mechanism applied to a fascia gun is as shown in FIG. 1 to FIG. 4. One end of a transmission arm 11 is hinged to a piston rod 12, and the piston rod 12 is slidably arranged on a guide ring 13 arranged on a fixed shell 14 of the fascia gun. The other end of the transmission arm 11 is rotatably connected to an output shaft 53 that is arranged at the top of the first eccentric post 5 and along the vertical direction. A distance between the output shaft 53 and a motor output shaft 71 of a motor assembly 7 is an eccentric distance. The vibration amplitude of the piston rod 12 can be adjusted by adjusting the eccentric distance.

Figure 2:
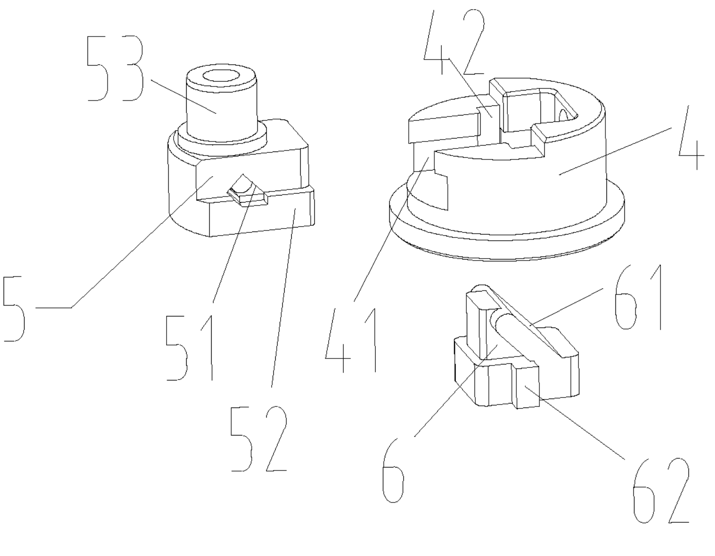
FIG. 2 is a schematic diagram of an eccentric holder, a first eccentric post and a first adjusting slider according to the embodiment of FIG. 1.
Figure 3:
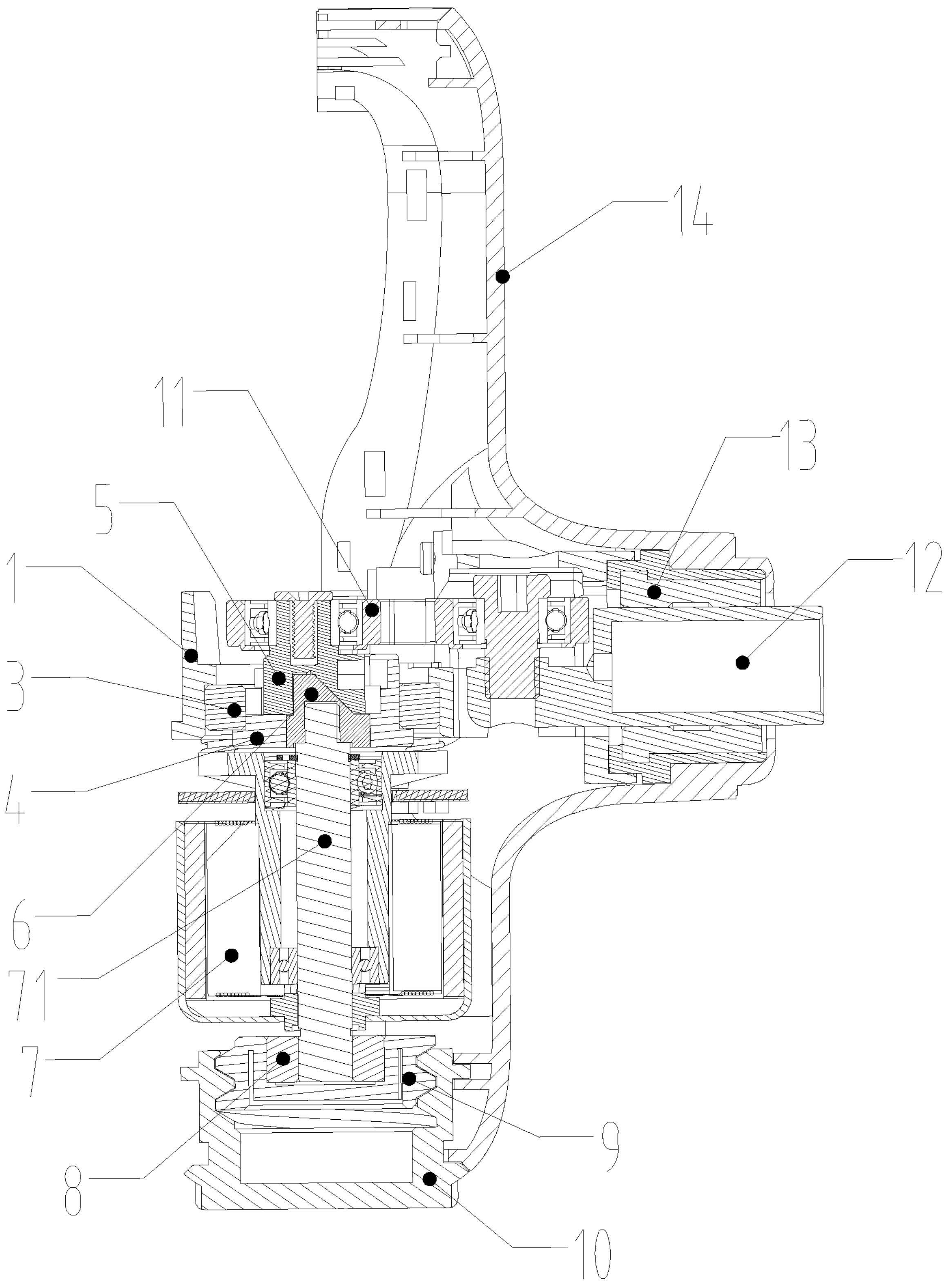
FIG. 3 is a schematic diagram of a motor output shaft moving upward and driving a first eccentric post to move to the right to obtain minimum amplitude according to the embodiment of FIG. 1.
Figure 4:
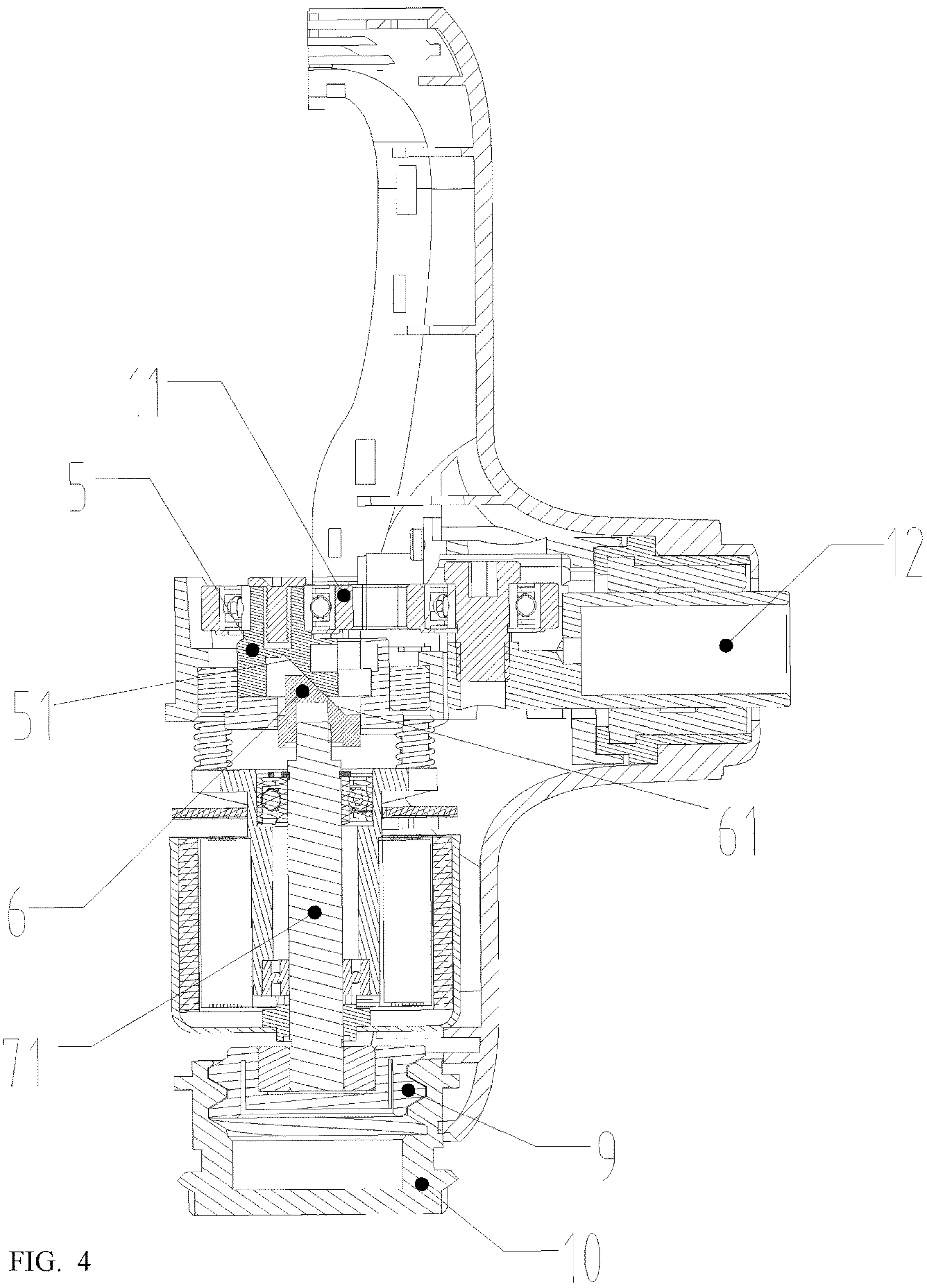
FIG. 4 is a schematic diagram of a motor output shaft moving downward and driving a first eccentric post to move to the left to obtain maximum amplitude according to the embodiment of FIG. 1.

As shown in FIG. 2, FIG. 3 and FIG. 4, the engagement of the eccentric holder 4, the first eccentric post 5 and the first adjusting slider 6 is the key to adjust the eccentric distance. An eccentric holder bearing 3 is sleeved outside the eccentric holder 4. The first eccentric post 5, in addition to the output shaft 53 arranged at the top thereof, is provided with a first eccentric post guide step 52 on both sides thereof and a first eccentric post inclined plane 51 therein. The first eccentric post inclined plane 51 is in close contact with the first adjusting slider inclined plane 61 at the top of the first adjusting slider 6 to form slidable engagement, where the first adjusting slider inclined plane 61 is angled relative to the motor output shaft 71. The eccentric holder 4 is internally provided with a first eccentric chute 41 in the horizontal direction thereof and a second eccentric chute 42 along the vertical direction thereof. The first eccentric post guide step 52 is slidably engaged with the first eccentric chute 41, and the first adjusting slider guide step 62 on both sides of the first adjusting slider 6 is slidably engaged with the second eccentric chute 42.

As shown in FIG. 3, when the motor output shaft 71 moves upward, the top of the motor output shaft 71 drives the first adjusting slider inclined plane 61 to move upward along the second eccentric chute 42, and the first adjusting slider inclined plane 61 moving upward drives the first eccentric post 5 to move laterally to the right along the first eccentric chute 41 through the first eccentric post inclined plane 51. When the eccentric post 5 moves laterally to the right, the distance between the output shaft 53 of the eccentric post 5 and the motor output shaft 71 is shortened, that is, the eccentric distance is shortened, thereby realizing the amplitude adjustment. When the first adjusting slider 6 moves upward to a limit position, a minimum eccentric distance is obtained, and the fascia gun has minimum amplitude.

Conversely, as shown in FIG. 4, when the motor output shaft 71 moves downward, the top of the motor output shaft 71 drives the first adjusting slider inclined plane 61 to move downward along the second eccentric chute 42, and the first adjusting slider inclined plane 61 downward moving causes the first eccentric post 5 rotating at a high speed to move laterally to the periphery thereof under a centrifugal force, that is, to move laterally to the left as shown in FIG. 4. When the eccentric post 5 moves laterally to the left, the distance between the output shaft 53 of the eccentric post 5 and the motor output shaft 71 is enlarged, that is, the eccentric distance is enlarged, thereby realizing the amplitude adjustment. When the first adjusting slider 6 moves downward to the limit position, a maximum eccentric distance is realized, and the fascia gun has maximum amplitude.

As an embodiment where the motor assembly 7 moves up and down, as shown in FIG. 1, FIG. 3 and FIG. 4, the motor output shaft 71 of the motor assembly 7 is arranged along the vertical direction, and the top of the motor assembly 7 is provided with a guide post 72 along the vertical direction, where the guide post 72 is externally sleeved with a compression spring, and the direction of the guide post 72 is parallel to that of the motor output shaft 71. The guide post 72 extends upward, passes through a damping guide sleeve 2 and is slidably arranged in a guide hole of a fixing stand 1, and the fixing stand 1 can be fixedly connected to the fixed shell 14. The guide post 72 is used to guide the motor assembly 7 to move upward or downward along the direction of the motor output shaft 71, and then drives the first adjusting slider 6 to move upward or downward. The compression spring can buffer the impact of vibration during operation on the motor assembly 7.

As an embodiment where the motor assembly driving mechanism drives the motor assembly 7 to move up and down, as shown in FIG. 1, FIG. 3 and FIG. 4, the bottom of the motor output shaft 71 passes through the bottom plane of the motor assembly 7, and the bottom of the motor output shaft 71 is connected to the threaded adjusting holder 9 through the adjusting holder bearing 8. An adjusting knob 10 is externally sleeved outside the threaded adjusting holder 9 and threadedly engaged with the threaded adjusting holder 9. The inner wall of the fixed shell 14 is provided with a groove; the periphery of the adjusting knob 10 is provided with an annular boss, where the annular boss is arranged on the peripheral wall of the adjusting knob 10 around the axis of the adjusting knob 10, and the adjusting knob 10 is rotatably arranged in the groove of the fixed shell 14 through the annular boss. The cooperative engagement between the annular boss and the groove of the fixed shell 14 ensures that the adjusting knob 10 can rotate only around the rotating shaft thereof, without sliding along the direction of the rotating shaft of the adjusting knob 10. The rotating adjusting knob 10 can cause the threaded adjusting holder 9 threadedly engaged with the adjusting knob 10 to move upward or downward, and the moving threaded adjusting holder 9 can drive the motor assembly 7 to move upward or downward, thereby adjusting the corresponding eccentric distance.

Another embodiment of a variable amplitude adjusting mechanism applied to a fascia gun is as shown in FIG. 5 to FIG. 8. In the embodiment, similarly, one end of a transmission arm 11 is hinged to a piston rod 12, and the piston rod 12 is slidably arranged on a guide ring 13 arranged on the fixed shell 14 of the fascia gun. The other end of the transmission arm 11 is rotatably connected to an output shaft 53 that is arranged on the second eccentric post 18 and along the vertical direction. Preferably, the fixed shell 14 and the rear shell 16 can be buckled to form a complete shell.

Figure 5:
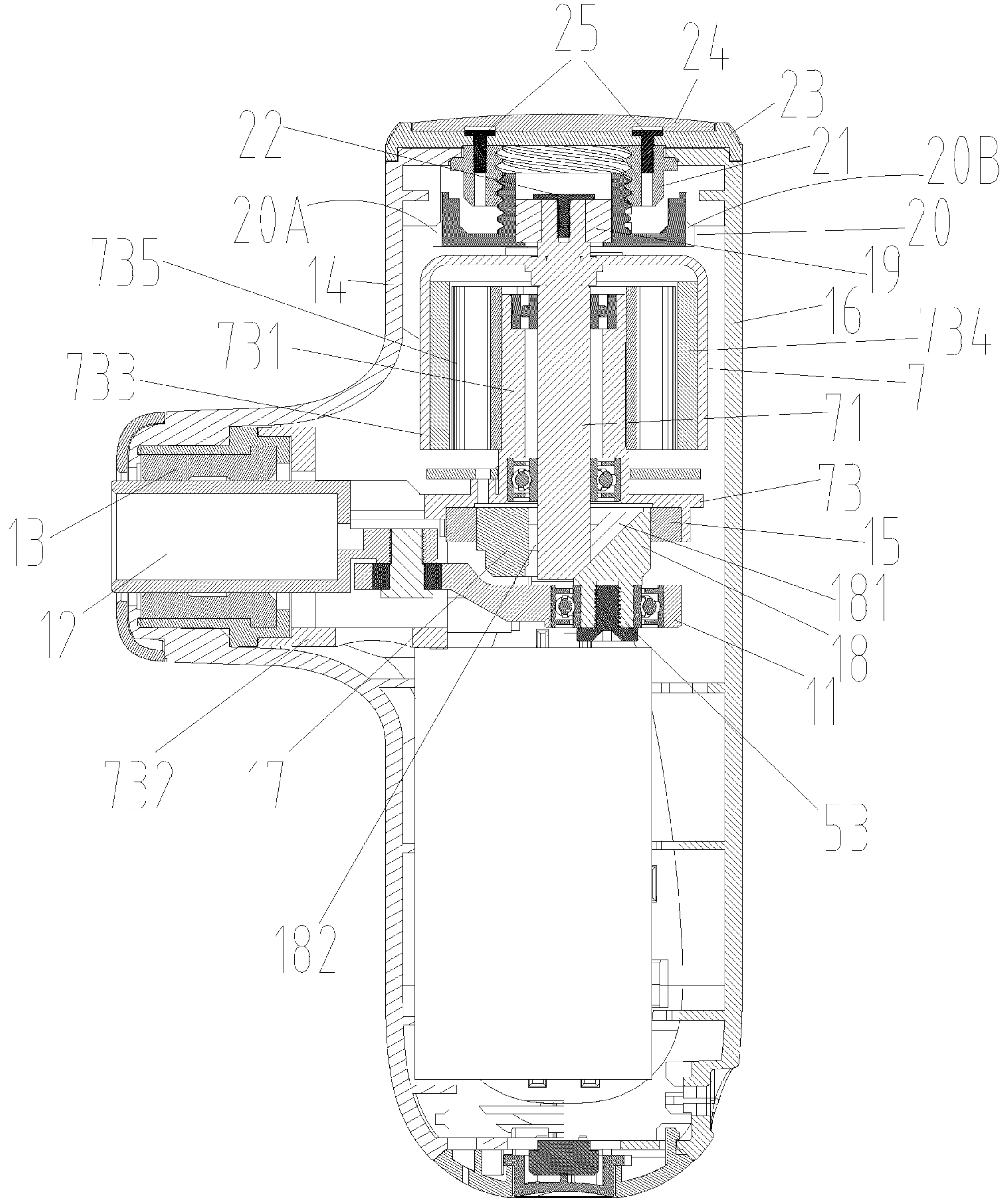
FIG. 5 is a schematic diagram of a motor output shaft moving downward and driving a second eccentric post to move right to obtain maximum amplitude when another embodiment of the utility model is applied to a fascia gun product.
Figure 7:
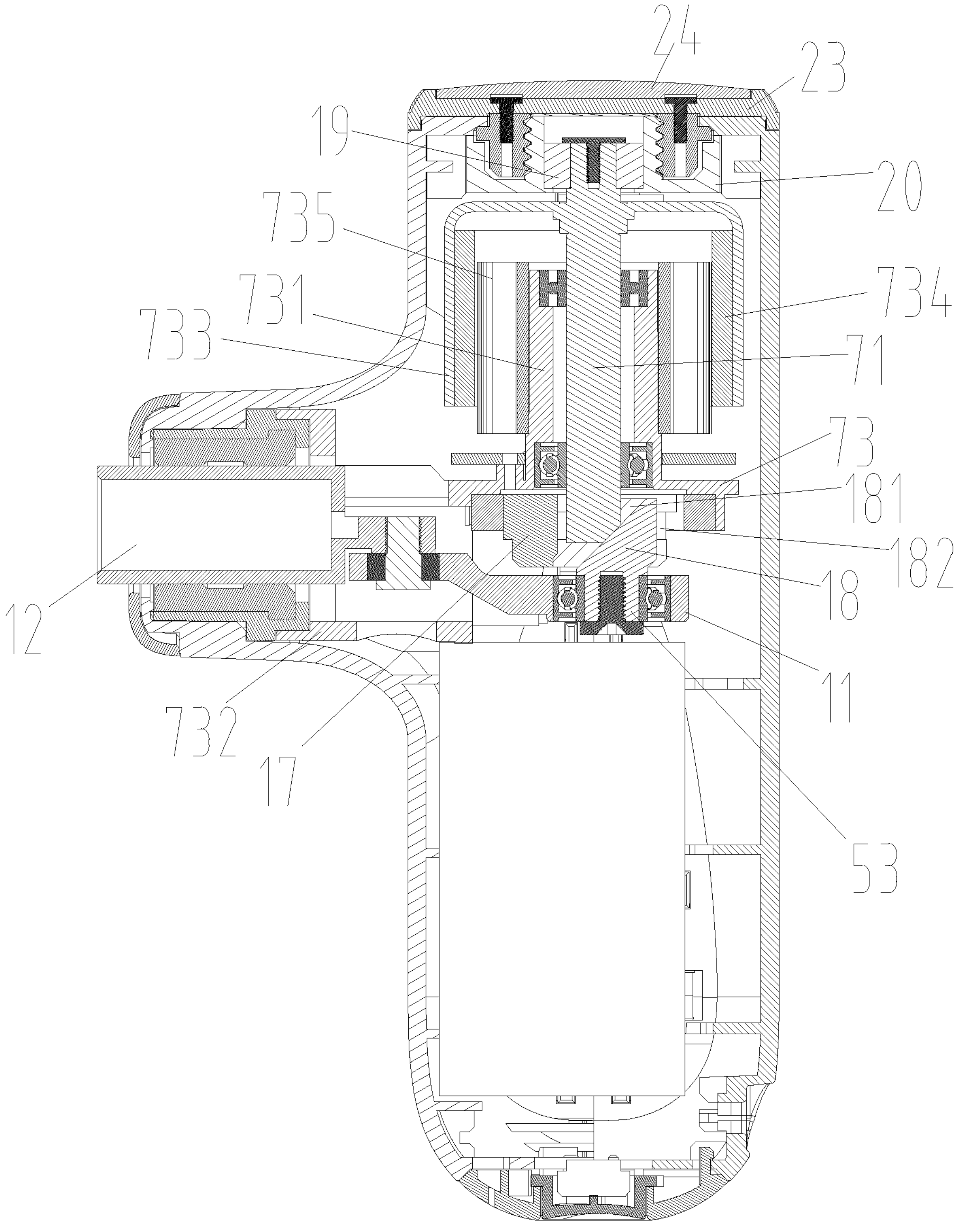
FIG. 7 is a schematic diagram of a motor output shaft moving upward and driving a second eccentric post to move left to obtain minimum amplitude when the embodiment of FIG. 5 is applied to a fascia gun product.

In the structure shown in FIG. 5 and FIG. 7, the motor stand 73 of the motor assembly 7 has a first mounting cylinder 731 and a second mounting cylinder 732 that have mutually perpendicular axes. The motor output shaft 71 is rotatably mounted in the first mounting cylinder 731 and is capable of sliding in relation to the first mounting cylinder 731, and the piston rod 12 is slidably arranged in the second mounting cylinder 732. During actual manufacturing, both the first mounting cylinder 731 and the second mounting cylinder 732 are integrated on the motor stand 73, which improves the integration level of components and further saves the internal space occupied by related components. An outer rotor 733 and a magnet steel piece 734 integrated in the outer rotor 733 are secured onto the motor output shaft 71, and a coil assembly 735 corresponding to the magnet steel piece 734 is sleeved on the first mounting cylinder. An upper end of the motor output shaft 71 is connected to a motor assembly driving mechanism, and a lower end of the motor output shaft 71 is provided with a wedge-shaped plane slidably engaged with the eccentric post. During actual driving, only part of the motor assembly 7 moves along the direction of the motor output shaft 71, while other part thereof is relatively fixed. The outer rotor 733 and the magnet steel piece 734 integrated in the outer rotor 733 are fixedly connected to the motor output shaft 71. Therefore, when the motor output shaft 71 moves up and down, the outer rotor 733 and the magnet steel piece 734 move up and down with the motor output shaft 71, while the positions of the coil assembly 735 and the first mounting cylinder 731 are relatively fixed. The motor output shaft 71 moving up and down drives the eccentric post to slide through the wedge-shaped plane at the lower end of the motor output shaft 71.

As an embodiment where the motor output shaft 71 drives the eccentric post to slide through the wedge-shaped plane, the bottom end of the motor output shaft 71 can be slidably engaged directly with the oblique slot of second eccentric post 181 of the second eccentric post 18. As shown in FIG. 5 to FIG. 8, because the oblique slot of second eccentric post 181 is angled relative to the axis of the motor output shaft 71, the up-and-down movement of the motor output shaft 71 can be converted into the left-and-right lateral movement of the second eccentric post 18 through the oblique slot of second eccentric post 181. Specifically, the second adjusting slider 17 includes a fixing slot of second adjusting slider 182, the direction of the fixing slot of second adjusting slider 182 is perpendicular to the motor output shaft 71, and the bottom end of the motor output shaft 71 passes through the second adjusting slider 17 and is slidably engaged with the oblique slot of second eccentric post 181. The side wall of the second eccentric post 18 is provided with a T-shaped lug boss slidably engaged with the fixing slot of second adjusting slider 182 of the second adjusting slider 17, that is, the second eccentric post 18 is clamped in the fixing slot of second adjusting slider 182 through the T-shaped lug boss on the side wall, thereby ensuring the second eccentric post 18 to slide along the direction of the fixing slot of second adjusting slider 182. Therefore, when the bottom end of the motor output shaft 71 drives the second eccentric post 18 to move, the up-and-down movement of the motor output shaft 71 can be converted into the left-and-right sliding of the second eccentric post 18 along the direction of the fixing slot of second adjusting slider 182. In view of the high-frequency vibration during the operation of the fascia gun, according to the structural characteristics of the embodiment, the stability of the engagement among the parts slidably engaged can be enhanced through a T-shaped structure, that is, the cross-section of the oblique slot of second eccentric post 181 is T-shaped, and the motor output shaft 71 is clamped in the oblique slot of second eccentric post 181 through the T-shaped inclined plane at the bottom. The cross-section of the fixing slot of second adjusting slider 182 is T-shaped, and the second eccentric post 18 is clamped in the fixing slot of second adjusting slider 182 through a T-shaped lug boss on a side wall.

Figure 6:
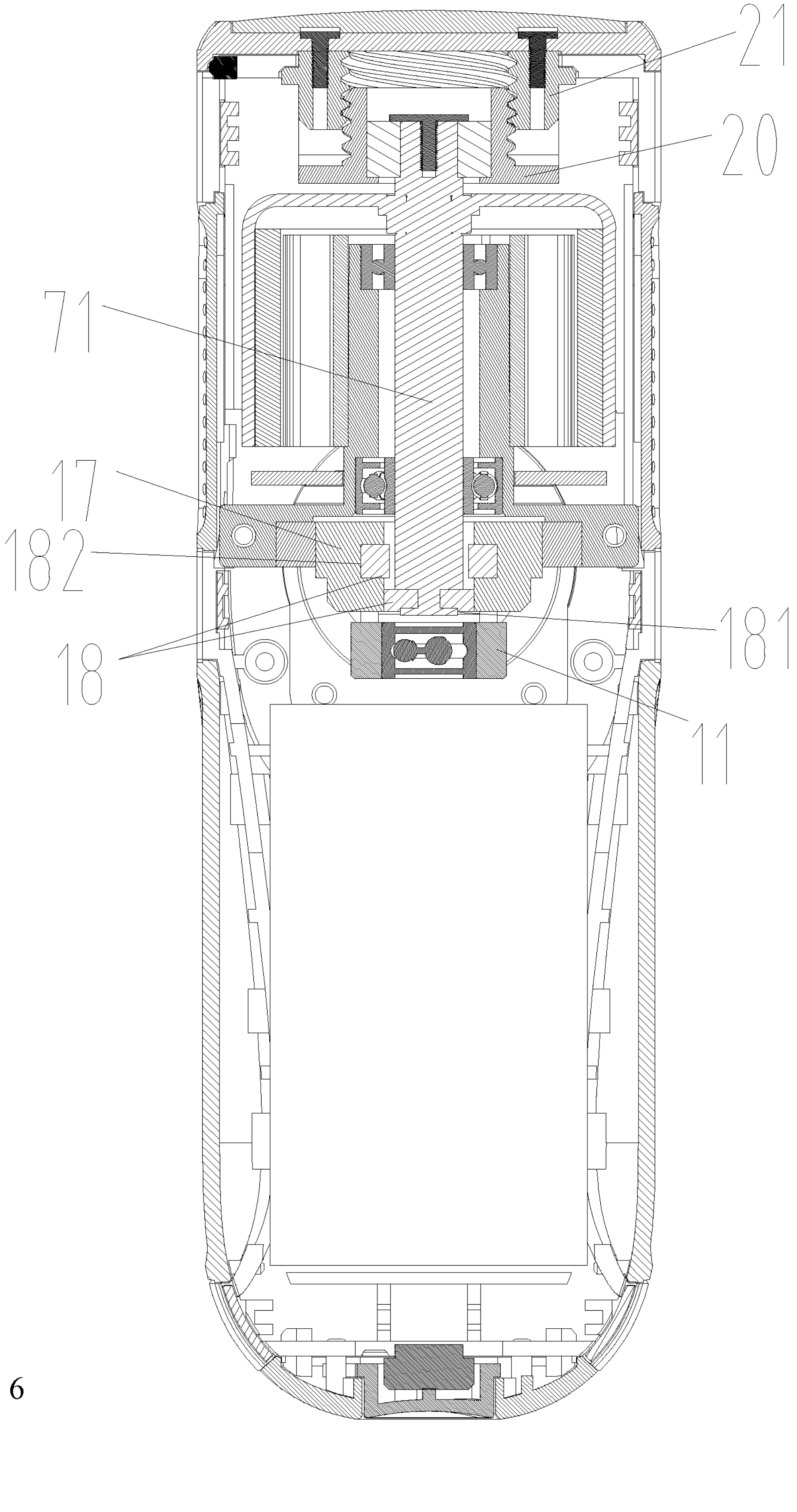
FIG. 6 is a section view of a side of FIG. 5.
Figure 8:
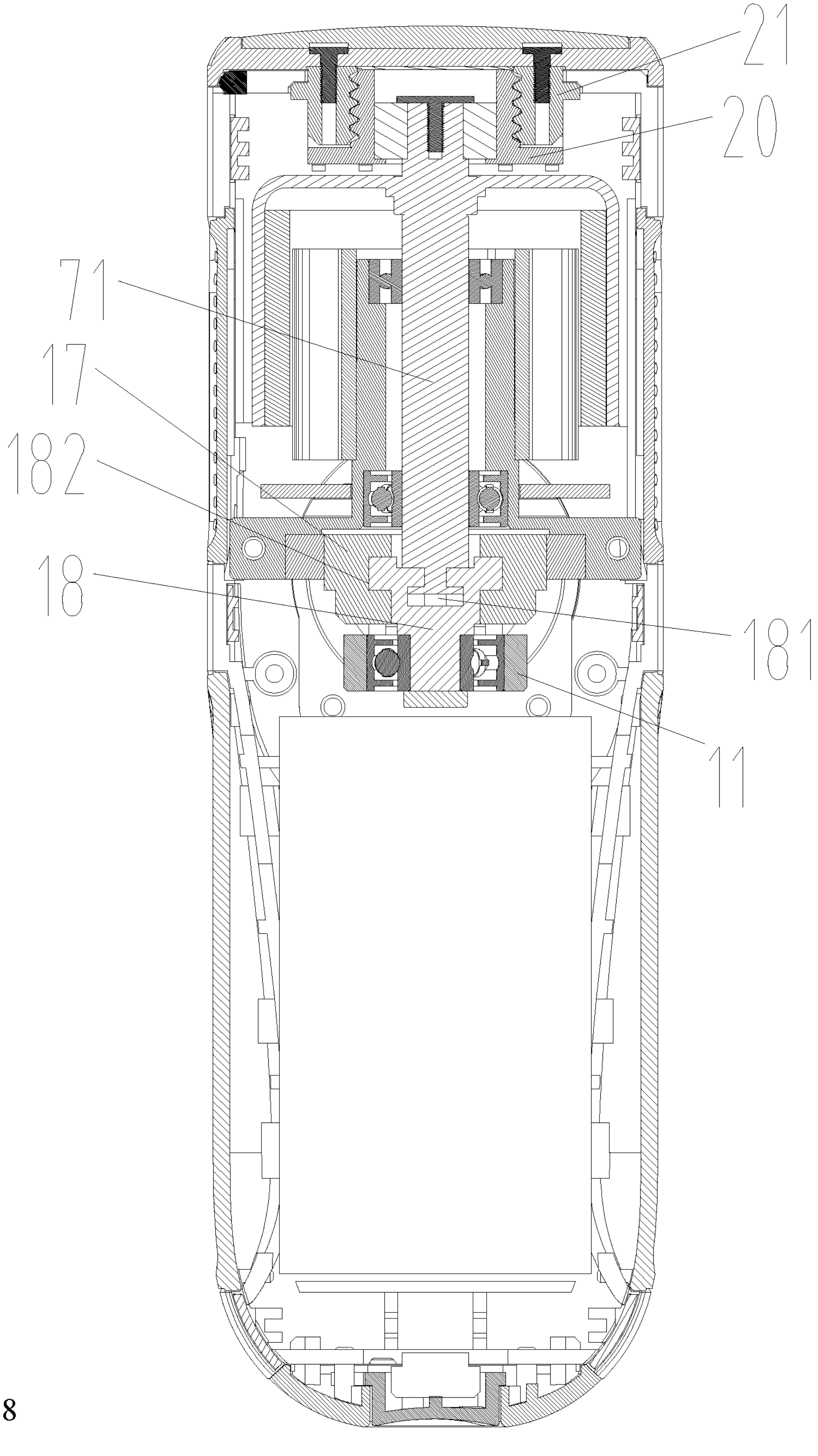
FIG. 8 is a section view of a side of FIG. 7.

In the above embodiment, as shown in FIG. 5 and FIG. 6, during the specific adjustment, when the motor output shaft 71 moves downward, the motor output shaft 71 drives the second eccentric post 18 to move rightward through the slidable engagement between the T-shaped inclined plane at the bottom end and the oblique slot of second eccentric post 181. During the movement, the second eccentric post 18 moves parallelly to the right along the fixing slot of second adjusting slider 182 under the guidance of the T-shaped lug boss on the side wall thereof. Consequently, the distance between the output shaft 53 of the second eccentric post 18 and the motor output shaft 71 is enlarged, that is, the eccentric distance is enlarged, thereby obtaining larger amplitude. Conversely, as shown in FIG. 7 and FIG. 8, when the motor output shaft 71 moves upward, the second eccentric post 18 moves parallelly to the left along the fixing slot of second adjusting slider 182, thereby reducing the eccentric distance and the amplitude.

As another embodiment where the motor assembly driving mechanism drives the motor assembly 7 to move up and down, as shown in FIG. 5 to FIG. 8, the top end of the motor output shaft 71 of the motor assembly 7 is rotatably engaged with the threaded slider 20 through a threaded bearing 19, and the threaded bearing 19 is secured by a threaded sleeve screw 22 arranged at the top end of the motor output shaft 71. The threaded slider 20 is threadedly engaged with the threaded sleeve 21, and the threaded sleeve 21 is arranged on the knob cover 23 through a knob cover screw 25, and the knob cover 23 is provided with a decorative top cover 24 to cover the knob cover screw 25, and the axis of the knob cover 23 is coaxially arranged with the axis of the motor output shaft 71. Besides, a left limit edge 20A and a right limit edge 20B are respectively arranged on both sides of the threaded slider 20, and extend along the direction of the motor output shaft 71; the left limit edge 20A is slidably arranged in a fixing slot of the fixed shell 14; and the right limit edge 20B is slidably arranged in a fixing slot of a rear shell 16. In actual use, the knob cover 23 is rotated to drive the threaded sleeve 21 to rotate synchronously, thereby driving the threaded slider 20 threadedly engaged with the threaded sleeve 21 to move upward or downward and the motor output shaft 71 to move upward or downward, and realizing the eccentric distance and amplitude adjustment. The left limit edge 20A and the right limit edge 20B are slidably arranged in the corresponding fixing slots respectively, so when the knob cover 23 is rotated, the threaded slider 20 moves only upward or downward without rotating around the axis thereof, thereby ensuring the accuracy of amplitude adjustment.

What is claimed is:

1. A variable amplitude adjusting mechanism, comprising a piston rod, a transmission arm, and a rotatable eccentric wheel, wherein one end of the transmission arm is hinged to the piston rod and the piston rod is slidably arranged; the eccentric wheel comprises an eccentric post and an adjusting slider, the adjusting slider is slidably connected to the eccentric post, and the eccentric post is hinged to the transmission arm; a motor assembly, wherein a motor output shaft of the motor assembly is connected to an input end of the eccentric wheel, an axis of the motor output shaft is arranged parallel to an axis of the eccentric post, and a sliding direction of the eccentric post is perpendicular to an axial direction of the motor output shaft, wherein at least part of the motor assembly is slidably arranged along the axial direction of the motor output shaft; and a motor assembly driving mechanism is connected to the motor assembly, wherein the motor assembly driving mechanism is configured to drive at least part of the motor assembly to move along the axial direction of the motor output shaft, so as to drive the eccentric post to slide and adjust a distance between the motor output shaft and the eccentric post;

wherein the motor assembly comprises a motor stand, wherein the motor stand is provided with a first mounting cylinder and a second mounting cylinder whose axes are perpendicular to each other, wherein the motor output shaft is rotatably mounted in the first mounting cylinder and the motor output shaft slides relative to the first mounting cylinder, and the piston rod is slidably arranged in the second mounting cylinder;

an outer rotor and a magnet steel piece integrated in the outer rotor are secured onto the motor output shaft, and a coil assembly is sleeved on the first mounting cylinder;

an upper end of the motor output shaft is connected to the motor assembly driving mechanism, and a lower end of the motor output shaft is provided with a wedge-shaped plane slidably engaged with the eccentric post; and wherein the motor assembly driving mechanism comprises a knob cover and a threaded slider threadedly engaged with a threaded sleeve on the knob cover, the threaded slider is connected to the top of the motor output shaft through a threaded bearing, and an axis of the knob cover and the axis of the motor output shaft are coaxially arranged; a left limit edge and a right limit edge are respectively arranged on both sides of the threaded slider, and extend along the direction of the motor output shaft; the left limit edge is slidably arranged in a fixing slot of a fixed shell; and the right limit edge is slidably arranged in a fixing slot of a rear shell.

2. The variable amplitude adjusting mechanism according to claim 1, wherein the motor assembly driving mechanism comprises an adjusting knob and a threaded adjusting holder threadedly engaged with the adjusting knob; the threaded adjusting holder is connected to a bottom of the motor output shaft through an adjusting holder bearing; and an axis of the adjusting knob and the axis of the motor output shaft are coaxially arranged.

3. The variable amplitude adjusting mechanism according to claim 2, comprising the fixed shell, wherein the fixed shell comprises a groove arranged in an inner wall; the adjusting knob comprises an annular boss, and the annular boss is arranged on a peripheral wall surface of the adjusting knob around the axis of the adjusting knob; and the adjusting knob is rotatably arranged in the groove of the fixed shell through the annular boss.

4. The variable amplitude adjusting mechanism according to claim 3, wherein the motor assembly comprises a guide post arranged at a top, wherein the guide post is uniformly arranged around the motor output shaft, an axial direction of the guide post is parallel to the axial direction of the motor output shaft, and the guide post is sleeved with a compression spring; and a fixing stand, wherein the guide post is slidably arranged in a guide hole of the fixing stand.

5. The variable amplitude adjusting mechanism according to claim 1, wherein the eccentric post comprises a first eccentric post; the adjusting slider comprises a first adjusting slider; an output shaft of the first eccentric post is hinged to the transmission arm; the first adjusting slider is arranged at the top of the motor output shaft;

the first eccentric post comprises a first eccentric post inclined plane; and the first adjusting slider comprises a first adjusting slider inclined plane; the first adjusting slider inclined plane is arranged obliquely to the motor output shaft; and the first adjusting slider inclined plane is slidably engaged with the first eccentric post inclined plane to drive the first eccentric post to slide in an axial direction perpendicular to the motor output shaft.

6. The variable amplitude adjusting mechanism according to claim 5, wherein the first eccentric post comprises a first eccentric post guide step arranged on both sides thereof; the first adjusting slider comprises a first adjusting slider guide step arranged on both sides thereof; the eccentric wheel comprises an eccentric holder, wherein the eccentric holder comprises a first eccentric chute horizontally arranged and a second eccentric chute vertically arranged; the first eccentric post guide step is slidably engaged with the first eccentric chute; and the first adjusting slider guide step is slidably engaged with the second eccentric chute.

7. The variable amplitude adjusting mechanism according to claim 1, wherein the eccentric post comprises a second eccentric post; the adjusting slider comprises a second adjusting slider; an output shaft of the second eccentric post is hinged to the transmission arm;

the second eccentric post comprises an oblique slot of second eccentric post angled relative to the axis of the motor output shaft; and the second adjusting slider comprises a fixing slot of the second adjusting slider, wherein a direction of the fixing slot of the second adjusting slider is perpendicular to the motor output shaft, and a bottom end of the motor output shaft passes through the second adjusting slider and is slidably engaged with the oblique slot of second eccentric post to drive the second eccentric post to slide along the direction of the fixing slot of the second adjusting slider.

8. The variable amplitude adjusting mechanism according to claim 7, wherein the cross-section of the oblique slot of second eccentric post is T-shaped, and the motor output shaft is clamped in the oblique slot of second eccentric post through a T-shaped inclined plane at the bottom end; and the cross-section of the fixing slot of second adjusting slider is T-shaped, and the second eccentric post is clamped in the fixing slot of second adjusting slider through a T-shaped lug boss on a side wall.

9. A fascia gun, comprising a guide ring, and the variable amplitude adjusting mechanism according to claim 1, wherein the piston rod is slidably arranged in the guide ring.

* * * * *